US008708420B2

(12) United States Patent
Ostermeyer

(10) Patent No.: US 8,708,420 B2
(45) Date of Patent: Apr. 29, 2014

(54) BULK MATERIAL HANDLING VEHICLE

(75) Inventor: Bernd Ostermeyer, Bundaberg (AU)

(73) Assignee: Maxitrans Australia Pty Ltd, Derrimut (AU)

( * ) Notice: Subject to any disclaimer, the term of this patent is extended or adjusted under 35 U.S.C. 154(b) by 559 days.

(21) Appl. No.: 12/742,253

(22) PCT Filed: Nov. 13, 2008

(86) PCT No.: PCT/AU2008/001690
§ 371 (c)(1),
(2), (4) Date: Aug. 5, 2010

(87) PCT Pub. No.: WO2009/062250
PCT Pub. Date: May 22, 2009

(65) Prior Publication Data
US 2010/0308638 A1 Dec. 9, 2010

(30) Foreign Application Priority Data
Nov. 15, 2007 (AU) .............................. 2007906264

(51) Int. Cl.
*B60P 1/00* (2006.01)
(52) U.S. Cl.
USPC ....................................... 298/18; 298/23 MD
(58) Field of Classification Search
USPC ........ 298/1 B, 7, 10, 13, 17.7, 18, 22 P, 23 D, 298/23 MD
See application file for complete search history.

(56) References Cited

U.S. PATENT DOCUMENTS

| 2,870,923 | A | | 1/1959 | Jewell |
| 3,687,321 | A | | 8/1972 | Goodhart et al. |
| 3,799,612 | A | | 3/1974 | Norton et al. |
| 4,666,211 | A | | 5/1987 | Smith et al. |
| 4,930,297 | A | | 6/1990 | Schlueter et al. |
| 5,006,039 | A | | 4/1991 | Niederer |
| 5,299,856 | A | | 4/1994 | Grosz |
| 7,722,125 | B1 | * | 5/2010 | Hehn .............................. 298/18 |

FOREIGN PATENT DOCUMENTS

AU    WO 94/26630    11/1994

OTHER PUBLICATIONS

European Patent Office, Supplmentary Search Report dated Nov. 19, 2010 for EP 08 85 0255.

* cited by examiner

*Primary Examiner* — Stephen Gordon
(74) *Attorney, Agent, or Firm* — Cascio & Zervas

(57) ABSTRACT

A vehicle including a chassis (50) and a load carrying container supported thereon, the container arranged for pivotable movement relative to the chassis of the vehicle to discharge material from the container in a lateral direction to a side of the chassis, the container including a lower container body (25) and an upper container body (4) mounted thereto for operable movement with fespect to said lower container body to provide a selectively openable discharge passage e.g., via openable side discharge door (32), between the upper and lower container bodies when the upper and lower bodies pivot with respect to one another.

42 Claims, 8 Drawing Sheets

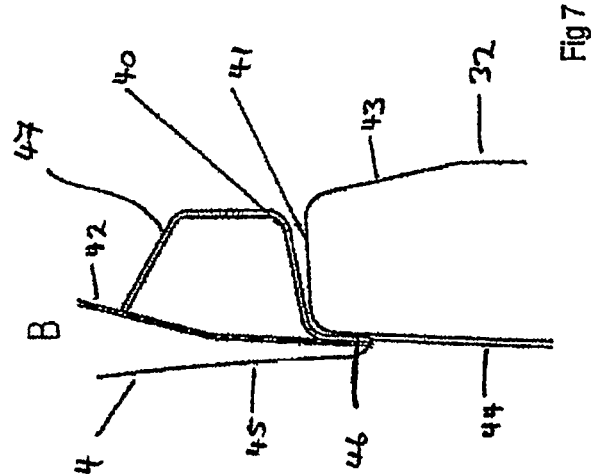
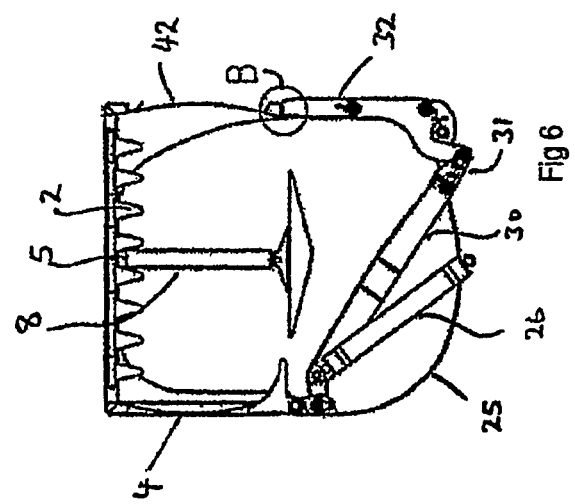

BULK MATERIAL HANDLING VEHICLE

TECHNICAL FIELD

The present invention relates to vehicles for transporting and discharging bulk materials, such as for large volume refuse (waste) material, grain, ore or coal, wood chips, and other bulky light material.

BACKGROUND

A wide range of vehicle constructions have been proposed and used in relation to vehicles for transporting bulk materials, and there is generally a conception that one of the principal requirements of such a vehicle is the ability to be able to discharge the load in a safe and effective manner which will enable the vehicle to remain substantially stable during unloading.

In known bulk material transport vehicles it is common to provide a material carrying body supported upon wheeled chassis for angular movement upon a fixed axis to an upwardly inclined discharge position. The axis about which the body tips is usually along one side of the chassis and hence a relatively high angle of tilt of the body is required to fully discharge the contents of the body.

Also as discharge is normally affected over the upper edge of the body, a high angle of tilt of the body is required to commence discharge of the contents of the body. An even greater angle of tilt is required to achieve total discharge of all of the body content.

Examples of vehicles having a construction of the above described general type are described in the following prior published patent specifications:

U.S. Pat. No. 3,799,612 NORTON ET AL
U.S. Pat. No. 3,687,321 GOODHART ET AL
U.S. Pat. No. 5,006,039 NIEDERER
AU 66404/94 VINOCUROFF

Another problem with the known constructions is the lack of stability of the vehicle during discharge, and the consequential limit on the carrying capacity thereof. It is necessary to be able to provide a rapid gravity induced discharge of the material to the side of the vehicle for efficiency in unloading. This can result in stability problems.

Also a problem arises from the fact that the dumped material is located close to the side of the vehicle and interferes with the passage of the vehicle into and out of the dump locations.

Such vehicles also have limited load carrying capacity restricted to the main load carrying body. Restricted load carrying capacity results in more journeys being required to be made or additional vehicles, all both of which result in increased direct (fuel) or indirect (driver costs) haulage costs.

It is therefore desirable to provide a load carrying vehicle of a construction which will provide enhanced load carrying capacity whilst enabling efficient and effective discharge of the vehicle load and maintaining substantial vehicle stability.

SUMMARY OF THE INVENTION

With this in view, there is provided a vehicle including a chassis and a load carrying container supported thereon, the container arranged for pivotable movement relative to the chassis of the vehicle to discharge material from the container in a lateral direction to a side of the chassis, the container including a lower container body and an upper container body mounted thereto for operable movement with respect to said lower container body to provide a selectively openable discharge passage between the upper and lower container bodies.

Another form of the present invention provides a vehicle including a chassis supported on a plurality of wheels to render it mobile, a load carrying container supported on the chassis for pivotable movement relative thereto to discharge in a lateral direction to a side of the chassis, said container including a lower container body and an upper container body mounted thereto for operable movement with respect to said lower container body to provide a selectively openable discharge passage between the upper and lower container bodies.

The upper container body may thus provides an extension "hood" additional load carrying capacity above the lower container body. In this way, high volume load carrying is achieved.

The upper container body may or may not be maintained in a horizontal position whilst the lower container body tips.

The upper container body may be partially or fully opened for unloading before the lower container body.

Preferably the container is arranged to discharge material through a side door opening laterally to one side of the chassis when the lower container body is raised and laterally displaced and the upper container body is raised above the lower body portion and pivoted thereto. Preferably the door is pivotably attached to the lower container body, but attachment to the upper container body is alternatively envisaged.

In a particular form of the present invention, there is provided a vehicle comprising a chassis supported on a plurality of wheels to render it mobile, a load carrying container supported on the chassis for transporting and discharging a load carried therein, said load carrying container, including a lower container body pivotally connected to the chassis by a first pivot mechanism along a longitudinal first side thereof and having a side discharge door therealong, and an upper container body disposed above the lower container body and hingedly connected thereto by a second pivot mechanism along at least a longitudinal second side opposite to the first side, the load carrying container being operatively mounted on the chassis to be selectively movable relative thereto to discharge material from within the container, the container being moved such that the lower container body is tipped sideways about said first pivot to a discharge position with the door open and the upper container body pivots with respect to the lower container body to provide additional discharge opening for material discharged to the side of the chassis.

The upper and lower container bodies provide increased load carrying capacity whilst the unloading configuration and operation maintains stability of the vehicle whilst effectively and efficiently unloading material through the open side door and the increased unloading gap created by operatively opening the gap between the lower and upper bodies through the respective pivoting actions.

Preferably the lower body has a floor structure that is generally bowl shape in cross section, which assists in collecting liquid draining from or through the load. The arrangement assists collection of such liquid, which liquid can be toxic or at least hazardous to health, and allows the liquid to be readily drained off or at least reduces contact with the load.

The lower container body may include two end walls and two longitudinal sides, one of which sides preferably includes the discharge opening door. The upper container body may have two corresponding end walls and two corresponding longitudinal sides. The lower container body end walls may include end wall extensions extending upwards to provide anti spill walls or plates at the ends of the container. Likewise, these may also or alternatively be provided on the end walls of the upper container body and extending downwards within the lower container when the container is closed for transport. These end wall extensions provide anti spill walls or extensions to restrict material from discharging out of the ends of the open container.

One or more of the end walls of the upper or lower container body may include extension covers which cover over the extension walls and prevent material of the load from interfering with the extension walls during the opening and closing operations of the container. These extension covers may be formed of a flexible or semi flexible material, and may be removable/replaceable eg when worn or damaged. They may be retained in place by respective releasable retainer means, such as upper edge mounting strips provided at the upper edge of the upper container body.

The lower container body may be tipped pivotably with respect to the chassis by power operated means to effect unloading of the container, preferably using one or more rams, and more preferably hydraulic rams, though one or more electric motors may be employed, or mechanical means such as hand operation.

Similarly, the upper container body may be tipped with respect to the lower container body, and thus may be maintained horizontal during the opening process, by power operated means, preferably by one or more rams, and more preferably hydraulic rams.

Conveniently, the upper container body (eg the extension hood) may retain a substantially upright relation to the chassis as it is raised above the lower body, and may move laterally with respect to the chassis as it pivots on the lower body to the discharge position.

Preferably, the body incorporates a base or floor forming the bottom of the lower body, which may be curved (eg bowl shaped) and may be arranged to form a downwardly inclined shute to one side of the chassis, to occupy a discharge position. Conveniently, the base of the body is hingedly connected to the remainder of the body, along an axis parallel to the longitudinal edge of the body remote from the side of the chassis over which the contents of the body are discharged.

Conveniently, a lower side edge of the upper container body opposite the pivot side may include a portion which overlaps an upper edge of the corresponding side wall of the lower container body thereunder. Preferably the overlap may be towards the interior of the lower container body. This may form a door retainer such that the discharge door provided as the opening side wall of the lower container body may close adjacent to the overlap therewithin. The overlap may include a door retainer member, such as a retainer plate.

The upper container body may be pivotably connected to the lower container body via a hinge mechanism. This may be provided as a substantially continuous hinge running along a length of the side wall of the lower container body. Alternatively, pivot points may be provided at the respect ends adjacent the end walls, and optionally therebetween. The pivot axis may include an elongate cylindrical member forming a hinge pin, and the upper container body may be mounted for pivotable movement thereto by at least one an sliding bush having a bearing surface with a curve corresponding to the curve of the cylinder(s) eg a round radius bearing surface matching the radius of the cylindrical pivot pin.

The combined effect of raising and laterally displacing the body, from its normal transport position on the chassis, to the discharge position, and the movement of the base to an inclined discharge disposition as the body is raised, results in the ability to achieve a rapid and total discharge of the contents of the upper and lower bodies whilst maintaining stability of the vehicle. Because the upper container body is raised, and the side door opened with the lower body tipped, the contents of the body will be rapidly gravity discharged from the enhanced volume of the combined upper and lower bodies. Further the material can be discharged through the bottom of the body across the full cross-section of the body thereby achieving a very rapid dumping of the contents. Also the lateral displacement of the lower body results in the contents being deposited outwardly of the path of the vehicle wheels to not interfere with the passage of the vehicle wheels during entry and exit of the vehicle.

The upper container body may be connected to the lower container body through a mounting means, such as a mounting plate. An upper container body hinge bush and pin arrangement may be used to connect to the cylindrical (pipe) body combing. A seal lubrication means may be provided, which may be formed including or consisting of plastics material to aid in the lubrication of the pivot system and reduce likelihood of material from leaking out through the side as the hinged upper conveyor body is raised. The seal means may be mounted to the pivotable upper container body rotate around a pipe body combing to ensure a continued seal between the upper conveyor body and the pipe body combing.

The invention will be more readily understood from the following description of at least one practical arrangement of the vehicle as illustrated with reference to the accompanying drawings.

BRIEF DESCRIPTION OF THE DRAWINGS

FIG. 6 shows an end view of a partial, embodiment of the present invention with side door and upper container body (body extension) overlap highlighted as 'B'.

FIG. 7 shows a close up view of features of portion 'B' of FIG. 6 above.

DESCRIPTION OF PREFERRED EMBODIMENTS

One or more embodiments of the present invention will hereinafter be described with reference to the accompanying drawings. These embodiments are not to be taken as limiting the generality of the present invention.

Figure 1:
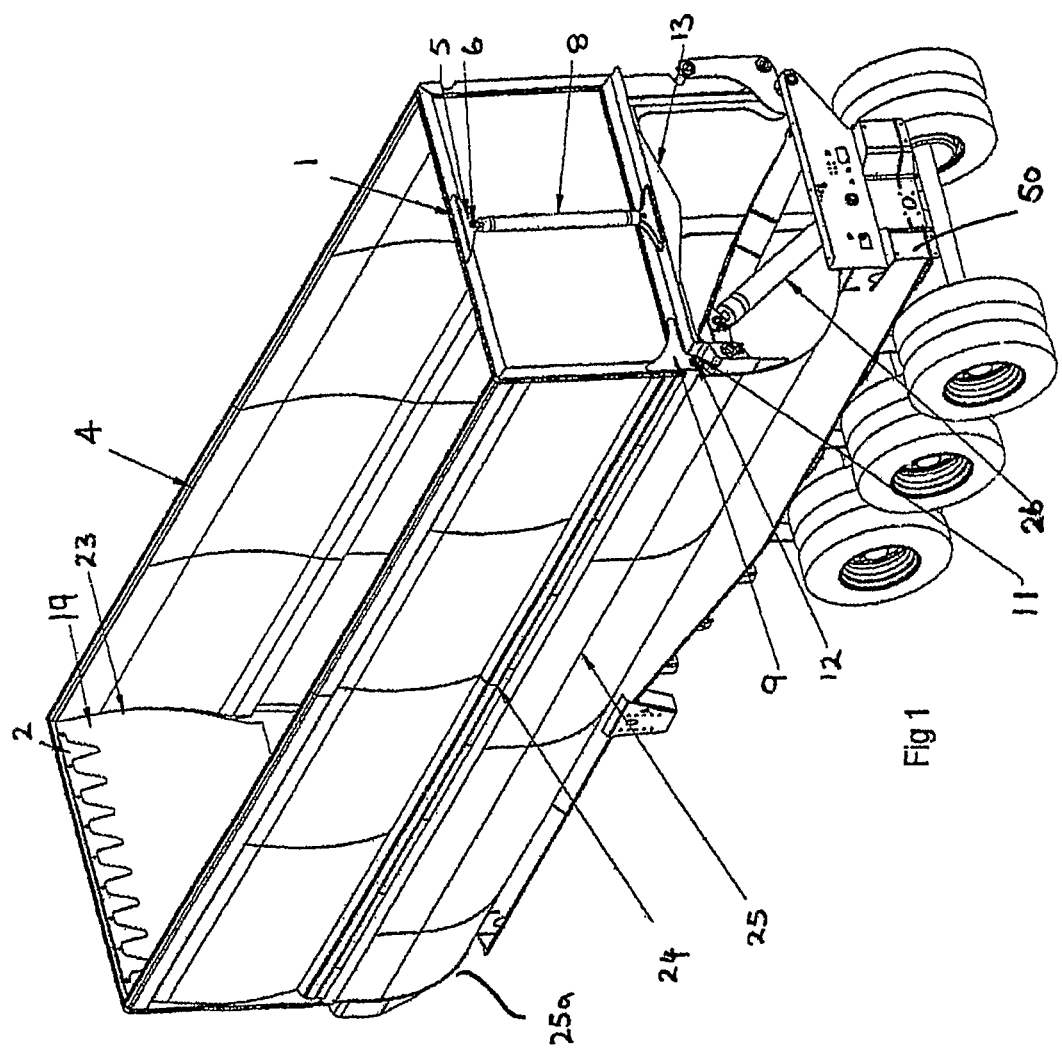
FIG. 1 shows an embodiment of the present invention in perspective with container body in closed configuration for hauling a toad.
Figure 2:
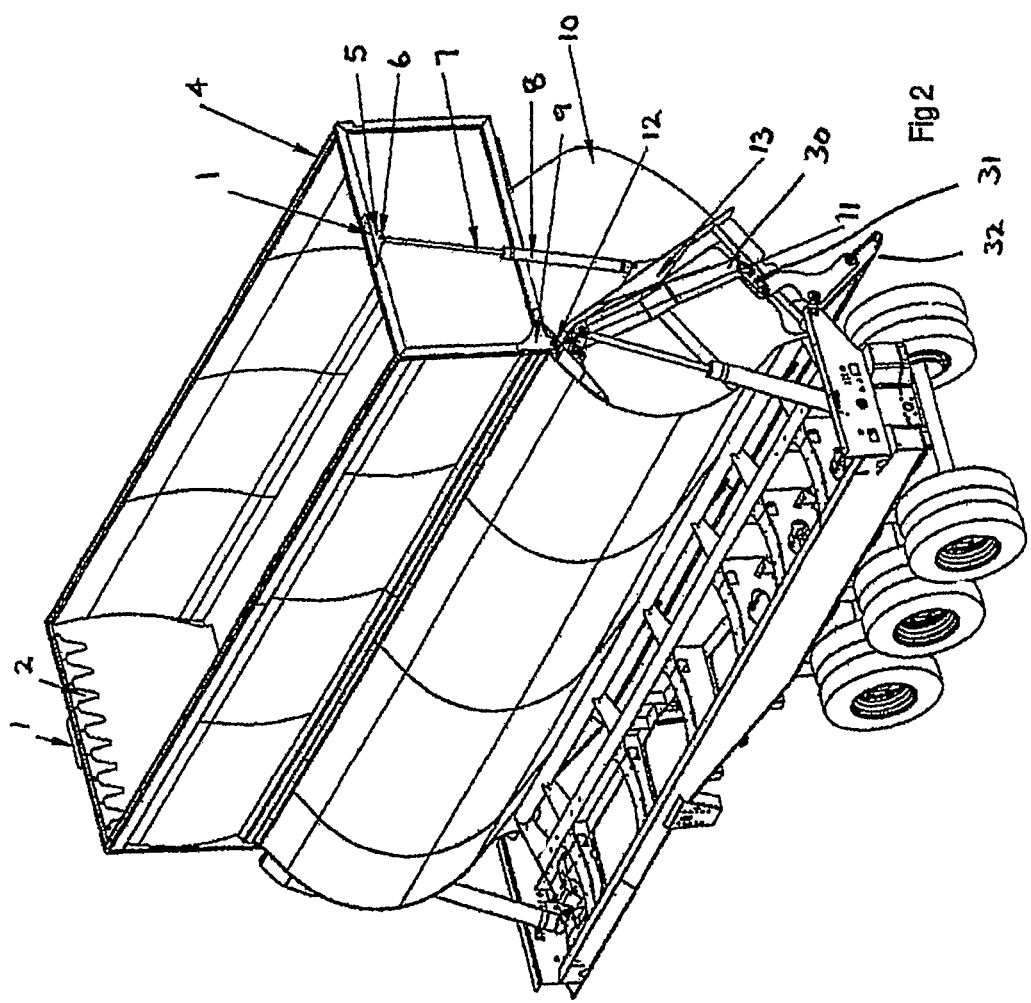
FIG. 2 shows an embodiment of the present invention in perspective with container body in open configuration for unloading.
Figure 3:
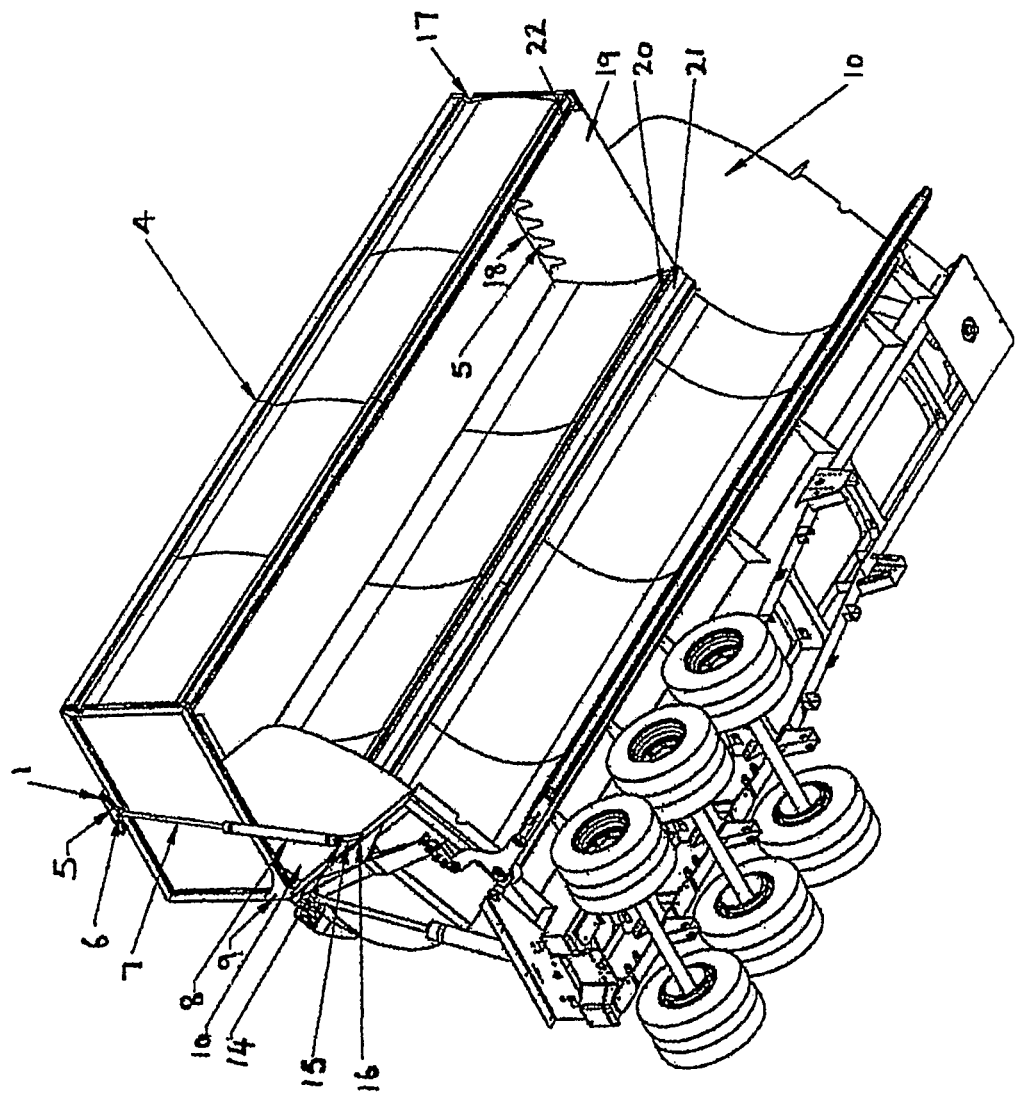
FIG. 3 shows an embodiment of the present invention in underside perspective with container body in open configuration for unloading.

As can be seen in FIGS. 1 to 3, as the main lift hoist 26 extends to lift the lower container body 25, the upper container body hoist 8 extends simultaneously keeping the hinged body top extension 4 (upper container body) in a horizontal orientation as it lifts via a connection to the body 25 and the hinged body top extension 4 through top hoist mount 5 and bottom hoist mount 15.

The anti spill plate 10 is mounted to the body 25 to prevent product from leaking out the ends as the hinged body top extension 4 and the body 25 separate. The spill plate cover 19 prevents product from falling between the anti spill plate 10 and the hinged body top extension 4, the spill plate cover 19 can be made from a number of different materials such as metal, reinforced rubber or plastic. The retainer plate 2 holds pressure on the spill plate cover 19 to assist in the prevention of product falling behind the anti spill plate 10 by inserting pressure on the spill plate cover in the direction of the anti spill plate 10. The spill plate cover 19 can be removed through removing retainer plate bolts 18, the retainer plate 2 and the spill plate cover bolts 23 to assist in cleaning and maintenance of the anti spill plate 10.

The hinged body top extension 4 is connected to the body 25 through a hinge mounting plate 20, top extension hinge bush 11 and top extension hinge pin 12 connected to the pipe body combing 21. The hinge seal lube plate 20 is made of plastic to aid in the lubrication of the hinge system and prevents product from leaking out through the side as the hinged body top extension 4 is raised. The hinge seal lube plate 20 is mounted to the hinged body top extension 4 and rotates around the pipe body combing 21 to ensure a continues seal between the hinged body top extension 4 and the pipe body combing 21. The safety strap 24 is used to prevent the hinged body top extension 4 coming away from the body 25 in the event of a rollover of the vehicle, a number of these are mounted along the body 25 under the pipe body combing 21 and welded to the hinged body top extension 4.

Figure 4:
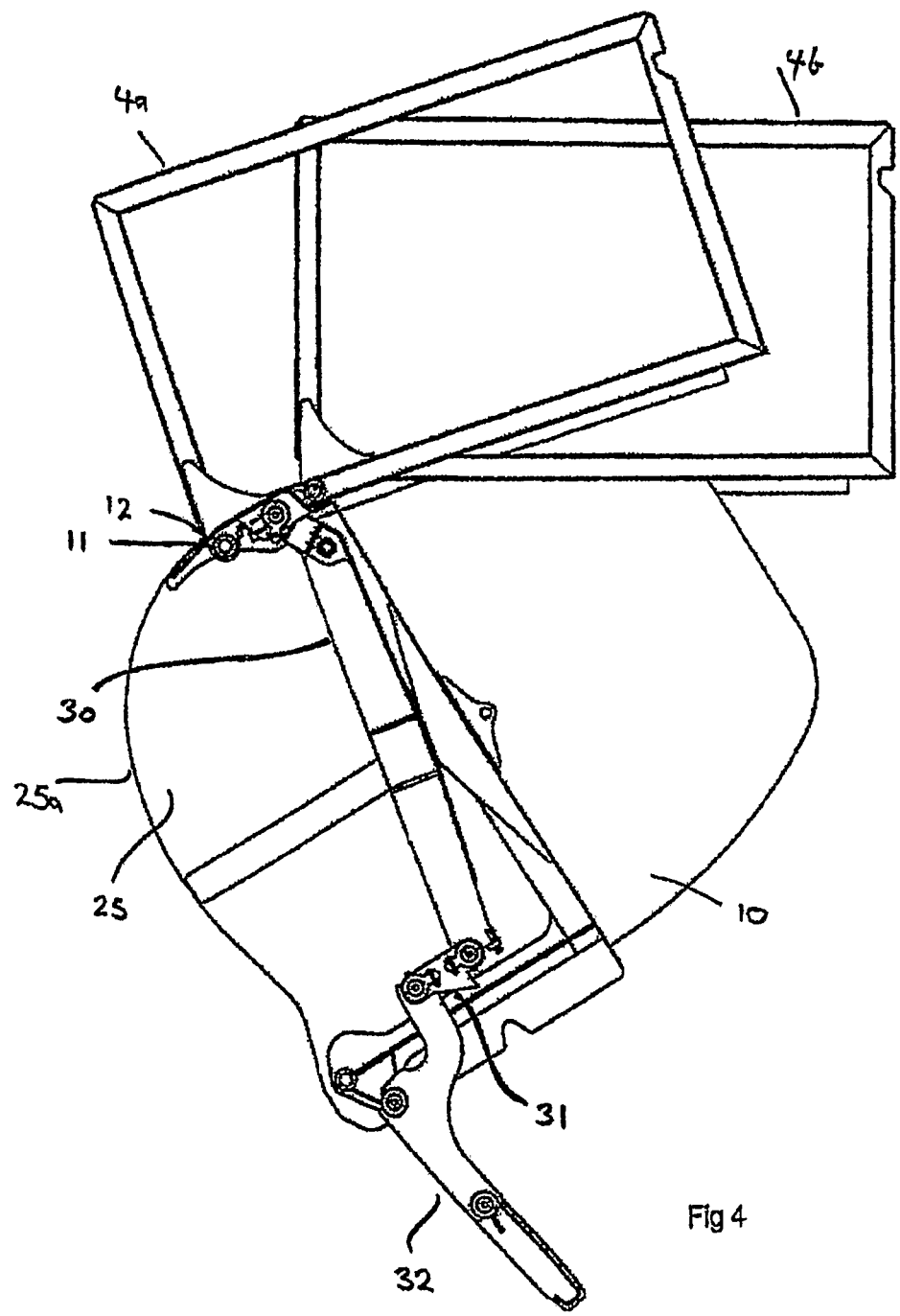
FIG. 4 shows a modified discharge position for the upper container body and side door opening arrangement of an embodiment of the present invention.

Shown in FIG. 4 in more detail, a link arm 30 is operatively connected to the side door 32 by a link pivotable link member. As the lower container tips sideways, the link arm operates via the link member to cooperatively open the side door to discharge a load to the side of the vehicle. The side door can act as a discharge ramp to ensure that material does not pile up immediately against the vehicle. In addition, FIG. 4 shows an alternative degree of opening 4a for the container. In such an arrangement, the upper container body is hingedly attached to the lower container body with the pivot axis below the link arm pivot point at each respective end of the container. In the arrangement shown with upper container body 4b, the respective pivot axis is above the link arm 30 pivot point. This allows the upper container body to pivot open wider with respect to the lower container body than in the standard opening arrangement 4b, and therefore has a centre of gravity more in line with a centreline of the vehicle, thus improving stability of the container during discharge. That is, the centre of gravity of the container is moved back towards the vehicle compared with the standard opening arrangement, thus increasing stability.

Figure 5:
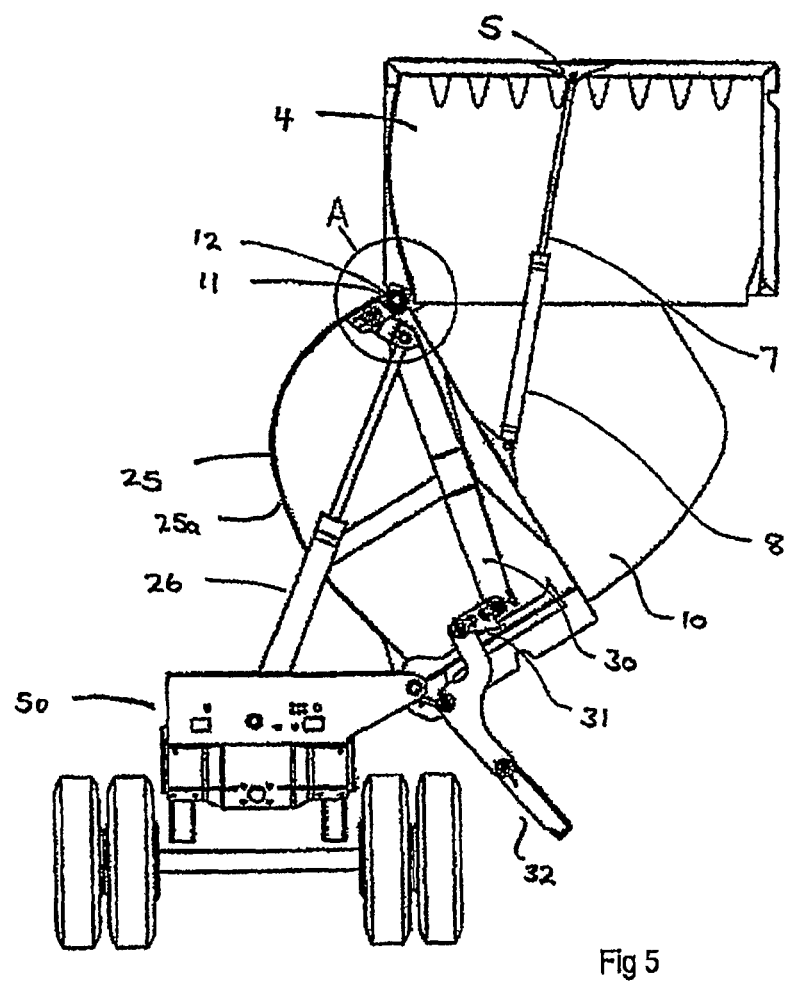
FIG. 5 shows an end view of an embodiment of the present invention in open, discharge configuration, with hinge arrangement 'A' highlighted.

FIG. 5 shows an end view of the vehicle according to an embodiment of the present invention in a discharge position with main ram 26 extended thereby causing the lower container body to tip sideways with respect to the chassis 50. This causes the link arm 30, via link member 31 to open the side discharge door 32. The curved base 25a of the lower container body assists discharge of material and also helps avoid need for a liquid catchment sump. With the main ram extending/extended, the secondary ram 8 operates to raise and pivot the upper container body 4 with respect to the lower container body. Optional end anti spill plates 10 restrict material from discharging out of the ends of the container. Spill plate covers 19 can be provided to protect the end anti spill plates from the load, and are preferably made or include flexible material, such as plastics, synthetic, polymeric, rubber or like materials. Closure of the container to a transport orientation can be the opposite of the opening procedure.

FIG. 6 shows the container, without chassis, in a closed orientation. Here can be seen at 'B' an embodiment of the overlap arrangement between the side door of the lower container body and the lower edge of the respective side of the upper container body (extension hood). FIG. 7 shows portion 'B' in more detail, with the side door 32 including an inner wall portion 44 abutting at a top portion thereof a portion of the side wall 42 of the upper container body 4. The outer wall portion 42 of the upper container body includes an abutment portion 46 against which the side door closes. This includes a reinforcing member 40 which also provides an upper sloped portion 47 to prevent build up of dirt, material and allow water runoff from the container.

Figure 8:
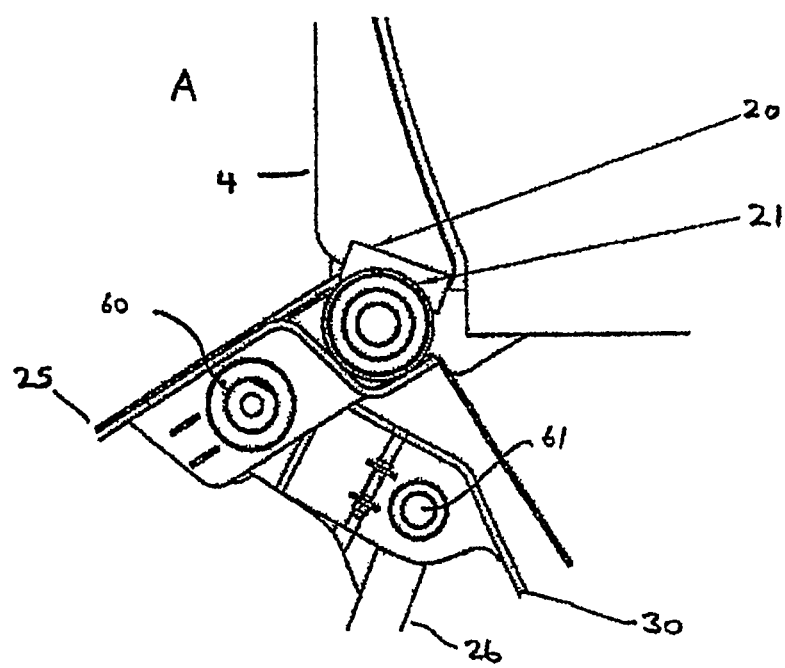
FIG. 8 shows a close up view of the hinge arrangement between upper and lower container body portions, and the pivot for the link arm and main ram arrangements, of portion 'A' of FIG. 5.
Figure 9:
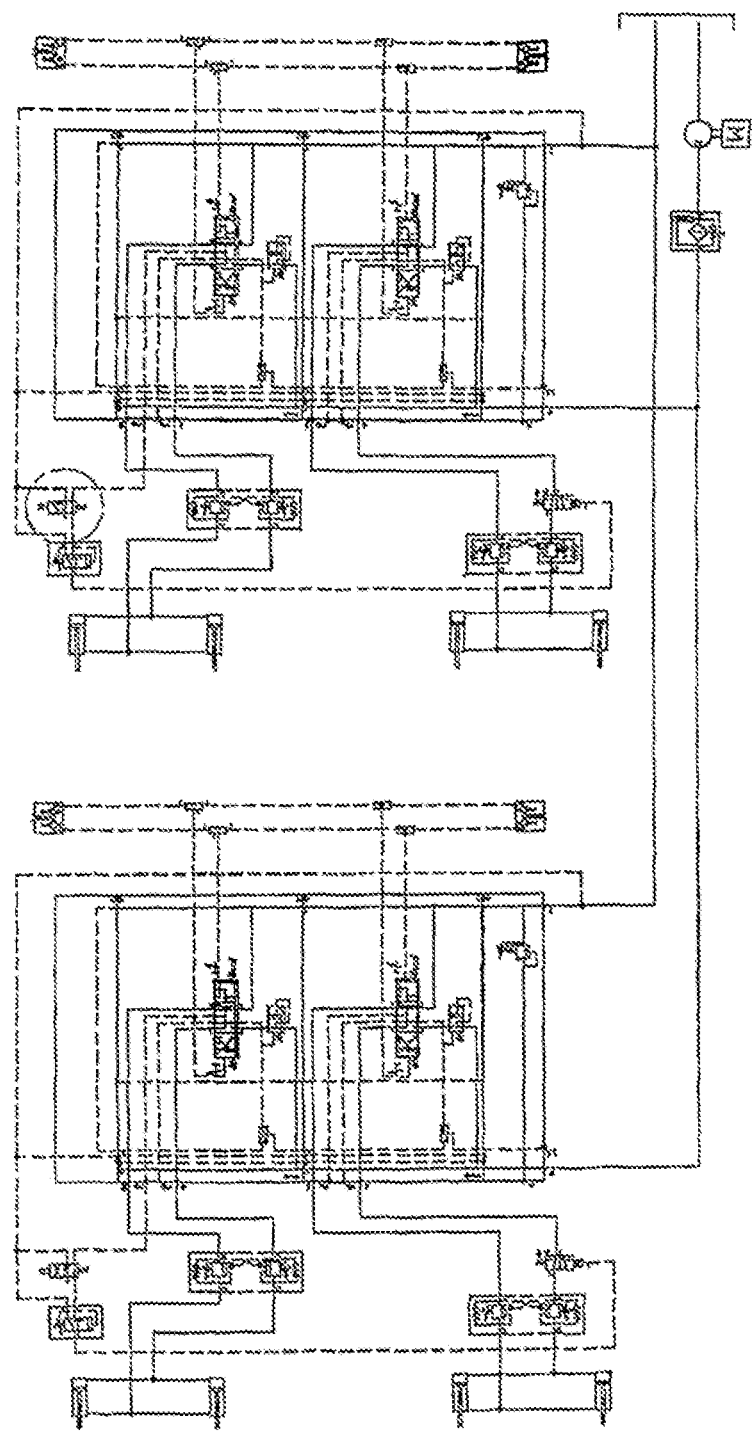
FIG. 9 shows an embodiment of a schematic of a hydraulic control system of the present invention, including control valves and sequence valve to prevent vehicle instability under certain unloading circumstances.

FIG. 8 shows detail 'A' of a hinge arrangement between the upper and lower body portions. This includes a hinge seal 20 and lube plate 20, preferably formed of or including polymeric, plastics, rubber, synthetic or like materials. Also shown is a pivot member 60 for the lifting assembly and link arm 30, by which pivot the link arm operates to open the side door 32 via the link member 31. The main ram 25 pivots at an upper end thereof via a main ram upper pivot 61.

The upper and lower container bodies can be operated by hydraulic cylinders. These cylinders can be controlled via one or more control valves, such as a double bank pressure compensating flow control valve. For example, when a "tip" cycle signal is sent to the valve(s) a specific volume of oil is sent to the lower container body lift cylinder(s) and a specific volume of oil is also sent to the upper container lift cylinder(s). Should the upper container body jam or the load be too great for the upper container body lift cylinder(s) to push, the valve spool will unload and the upper container lift cylinder(s) will stall while the lower container cylinder(s) will continue to tilt the lower container resulting in the whole vehicle tipping over. Consequently, it has been found advantageous to provide a sequence valve to the upper container body cylinder line, so that when the pressure raises in the upper container cylinder line to or above a certain amount e.g. 2000 psi, the sequence valve sends a pilot signal to shut off oil supply to the lower container body cylinder, stopping the whole tip cycle so that the whole vehicle can never tip over.

Furthermore, another valve may be provided in the system so that when the upper container body cylinder(s) are fully extended they depress a roller plunger on the DCV stopping the pilot signal from reaching the sequence valve and allow the upper container body to be fully open before the main lift cylinder(s) have reached end of stroke and allow the main lift cylinder(s) to keep extending.

The container body with upper and lower container body portions is shown mounted to a chassis for a road vehicle. However, it will be appreciated that other forms of transport may incorporate the present invention in one or more of its various forms, such as for rail or water craft transport.

It will be appreciated that the present invention can advantageously be generally directed to be used on a vehicle side tipper system utilizing a bowl floor design to aid in the prevention of wet product leakage onto the ground without the use of a separate sump system for hauling and unloading high volume low density products.

The invention claimed is:

1. A vehicle including a chassis and a load carrying container supported thereon, the container arranged for pivotable movement relative to the chassis of the vehicle to discharge material from the container in a lateral direction to a side of the chassis, the container including a lower container body and an upper container body mounted thereto for operable movement with respect to said lower container body to provide a selectively openable discharge passage between the upper and lower container bodies wherein the upper container body is pivotally connected to the lower container body via a hinge mechanism that includes a seal and seal lubrication means, which lubrication means includes plastics material to aid in the lubrication of the hinge mechanism and wherein the seal is mounted to the pivotable upper container body to rotate around a pipe body defining a combing.

2. A vehicle according to claim 1, wherein the upper container body provides an extension portion additional load carrying capacity above the lower container body.

3. A vehicle according to claim 1, wherein the container includes a side door, the container arranged to discharge material laterally to one side of the chassis when the side door is opened to a material discharge position.

4. A vehicle according to claim 1, wherein, in use, the lower container body is pivotably raised and laterally displaced, and the upper container body is pivotably raised with respect to the lower container body, to configure the vehicle to a material discharge position.

5. A vehicle including a chassis and a load carrying container supported thereon, the container arranged for pivotable movement relative to the chassis of the vehicle to discharge material from the container in a lateral direction to a discharge side of the chassis, the container including a lower container body and an upper container body mounted thereto for operable movement with respect to said lower container body to provide a selectively openable discharge passage between the upper and lower container bodies, wherein the chassis is supported on a plurality of wheels to render it mobile, the container is a load carrying container supported on the chassis for transporting and discharging a load carried therein, said lower container body is pivotably connected to the chassis by a first pivot mechanism along a longitudinal first side thereof at the discharge side of the chassis and having a side discharge door therealong, and said upper container body is disposed above the lower container body and hingedly connected thereto by a second pivot mechanism along at least a longitudinal second side opposite to the first side, the load carrying container being operatively mounted on the chassis to be selectively movable relative thereto to discharge material from within the container, the container being moved such that the lower container body is tipped sideways about said first pivot mechanism to a discharge position with the door open and the upper container body pivots with respect to the lower container body to provide additional discharge opening for material discharged to the discharge side of the chassis.

6. A vehicle according to claim 1, wherein the lower body has a floor structure that is generally bowl shape in cross section.

7. A vehicle according to claim 1, wherein the lower container body has two end walls, each at a respective end of the container, and two longitudinal sides, one of which sides includes a discharge door.

8. A vehicle according to claim 7, wherein the upper container body has two corresponding end walls, each at a respective end of the container, and two corresponding longitudinal sides.

9. A vehicle according to claim 7, wherein each of the lower container body end walls includes a respective end wall extension extending upwards to provide an anti spill wall or plate adjacent each respective end of the container.

10. A vehicle according to claim 8, wherein the upper container body end walls include extensions extending downwards to provide anti spill walls or extensions to restrict material from discharging out of the ends of the container when the container is open.

11. A vehicle according to claim 7, wherein at least one of end walls of the upper container body includes an extension cover which covers over an extension wall to prevent discharging material from interfering with the extension wall during operable movement of the upper container body with respect to said lower container body of the container.

12. A vehicle according to claim 11, wherein the extension cover(s) includes a flexible or semi flexible material, and is/are optionally removable/replaceable by respective releasable retainer means.

13. A vehicle according to claim 1, wherein the lower container body, for discharge of material, is tipped pivotably with respect to the chassis by power operated means to effect unloading of the container.

14. A vehicle according to claim 1, wherein the upper container body, for discharge of material, is pivoted with respect to the lower container body.

15. A vehicle according to claim 1, wherein the container incorporates a base or floor in a bottom portion of the lower container body arranged, during discharge of material, to form a downwardly inclined chute to one side of the chassis to occupy a discharge position.

16. A vehicle according to claim 15, wherein the base of the container is hingedly connected to an extension portion of the upper container body along an axis parallel to a longitudinal edge of the lower container body remote from the side of the chassis from which material is discharged.

17. A vehicle according to claim 1, wherein the container is arranged for pivotal movement relative to a first side of the chassis and a lower side edge of the upper container body opposite the first side of the chassis having a portion which overlaps an upper edge of a side wall of the lower container body opposite said first side of the chassis.

18. A vehicle according to claim 17, wherein the overlap is towards an interior of the lower container body and forms a door retainer such that a discharge door provided as an opening side wall of the lower container body closes adjacent to the overlap.

19. A vehicle according to claim 1, wherein the hinge mechanism includes a substantially continuous hinge running along a length of a side wall of the lower container body.

20. A vehicle according to claim 1, wherein the hinge mechanism includes pivot points provided at respective ends thereof adjacent container end walls, and therebetween.

21. A vehicle according to claim 1, wherein the hinge mechanism has a pivot axis defined by at least one elongate cylindrical member forming a hinge pin, and the upper container body is mounted for pivotable movement on the hinge pin by at least one sliding bush having a curved bearing surface engaged with the at least one cylindrical member.

22. A vehicle according to claim 5, wherein the lower body has a floor structure that is generally bowl shape in cross section.

23. A vehicle according to claim 5, wherein the lower container body has two end walls, each at a respective end of the lower container body, and two longitudinal sides, one of which sides includes said side discharge door.

24. A vehicle according to claim 23, wherein the upper container body has two corresponding end walls, each at a respective end of the lower container body, and two corresponding longitudinal sides.

25. A vehicle according to claim 23, wherein the lower container body end walls include end wall extensions extending upwards to provide an anti spill wall or plate adjacent each respective end of the container.

26. A vehicle according to claim 24, wherein the upper container body end walls include extensions extending downwards to provide anti spill walls or extensions to restrict material from discharging over the end walls of the lower container body.

27. A vehicle according to claim 23, wherein at least one of end walls of the upper container body or at least one of the end walls of the lower container body includes at least one extension cover which covers over an extension wall to prevent discharge material from interfering with the extension wall during pivoting of the lower container body at the first pivot mechanism.

28. A vehicle according to claim 27, wherein the extension cover(s) includes a flexible or semi flexible material, and is/are optionally removable/replaceable by respective releasable retainer means.

29. A vehicle according to claim 5, wherein the lower container body, for discharge of material, is tipped pivotably with respect to the chassis by power operated means to effect unloading of the container.

30. A vehicle according to claim 5, wherein the upper container body, for discharge of material, is pivoted with respect to the lower container body.

31. A vehicle according to claim 5, wherein the container incorporates a base or floor in a bottom portion of the lower container body arranged, during discharge of material, to form a downwardly inclined chute to one side of the chassis to occupy a discharge position.

32. A vehicle according to claim 31, wherein the base of the container is hingedly connected to the upper container body along an axis parallel to a longitudinal side of the lower container body remote from the discharge side of the chassis.

33. A vehicle according to claim 5, wherein the container is arranged for pivotal movement relative to the discharge a side of the chassis, a lower side edge of the upper container body opposite the discharge side of the chassis having a portion which overlaps an upper edge of a side wall of the lower container body opposite said discharge side of the chassis.

34. A vehicle according to claim 33, wherein the overlap is towards an interior of the lower container body and forms a door retainer such that a discharge door provided as an opening side wall of the lower container body closes adjacent to the overlap.

35. A vehicle according to claim 5, wherein the second pivot mechanism is a hinge mechanism.

36. A vehicle according to claim 35, wherein the hinge mechanism includes a substantially continuous hinge running along a length of a side wall of the lower container body.

37. A vehicle according to claim 35, wherein the hinge mechanism includes pivot points provided at respective ends thereof adjacent container end walls, and therebetween.

38. A vehicle according to claim 35, wherein the hinge mechanism has a pivot axis defined by at least one elongate cylindrical member forming a hinge pin, and the upper container body is mounted for pivotable movement by at least one sliding bush having a curved bearing surface engaged with the at least one cylindrical member.

39. A vehicle according to claim 35, wherein the hinge mechanism includes a seal and seal lubrication means, which lubrication means includes or substantially consists of plastics material to aid in the lubrication of the hinge mechanism.

40. A vehicle according to claim 39, wherein the seal is mounted to the upper container body to rotate around a pipe body defining a combing.

41. A vehicle according to claim 7, wherein at least one of the end walls of the lower container body includes an extension cover which covers over an extension wall to prevent discharging material from interfering with the extension wall during operable movement of the upper container body with respect to said lower container body of the container.

42. A vehicle according to claim 23, wherein at least one of the end walls of the lower container body includes an extension cover which covers over an extension wall to prevent discharging material from interfering with the extension wall during operable movement of the upper container body with respect to said lower container body of the container.

* * * * *